United States Patent
Viger et al.

(10) Patent No.: US 8,812,633 B2
(45) Date of Patent: Aug. 19, 2014

(54) METHOD FOR MANAGING ADDRESS SPACES AT AN OPENING OF A COMMUNICATIONS TUNNEL, CORRESPONDING TUNNEL END-POINT, AND STORAGE MEANS

(75) Inventors: Pascal Viger, Janze (FR); Stéphane Baron, Le Rheu (FR)

(73) Assignee: Canon Kabushiki Kaisha, Tokyo (JP)

( * ) Notice: Subject to any disclaimer, the term of this patent is extended or adjusted under 35 U.S.C. 154(b) by 486 days.

(21) Appl. No.: 12/566,976

(22) Filed: Sep. 25, 2009

(65) Prior Publication Data

US 2010/0077064 A1 Mar. 25, 2010

(30) Foreign Application Priority Data

Sep. 25, 2008 (FR) ...................... 08 56458

(51) Int. Cl.
*G06F 15/177* (2006.01)
(52) U.S. Cl.
USPC ........... 709/221; 709/222; 709/225; 709/226; 709/228

(58) Field of Classification Search
USPC ........................................ 709/221
See application file for complete search history.

(56) References Cited

U.S. PATENT DOCUMENTS

| 7,457,820 | B1 | 11/2008 | Viger et al. |
| 2004/0179482 | A1* | 9/2004 | Rusu ............................. 370/254 |
| 2005/0066035 | A1* | 3/2005 | Williams et al. .............. 709/226 |
| 2007/0127461 | A1 | 6/2007 | Yamada et al. |
| 2007/0266125 | A1* | 11/2007 | Lu et al. ......................... 709/222 |
| 2009/0222559 | A1* | 9/2009 | Anipko et al. ................. 709/225 |

* cited by examiner

*Primary Examiner* — Hua Fan
(74) *Attorney, Agent, or Firm* — Fitzpatrick, Cella, Harper & Scinto

(57) ABSTRACT

A method is proposed for providing a remedy to the problem of address conflict when setting up a communications tunnel between a first tunnel end-point of a first communications sub-network and a second tunnel end-point of a second communications sub-network distinct from said first sub-network, in proposing an efficient method for the dynamic management of the address spaces of each sub-network, implemented by a tunnel end-point upon detection of a request for linking two sub-networks by a tunnel.

16 Claims, 9 Drawing Sheets

Figure 5

| MAC Address | IP Address | Protocol type | Class of apparatus | active |
|---|---|---|---|---|
| 11:22:33:aa:aa:cc | 192.168.1.1 | UPnP | IGD | yes |
| 11:22:33:aa:bb:cc | 192.168.1.8 | UPnP | DMS | yes |
| 11:22:33:aa:bb:dd | 192.168.1.2 | UPnP | DMP | - |
| ... | 192.168.1.4 | N/A | FTP Server | yes |
| ... | 192.168.1.3 | Hello (Bonjour) | printer | - |
| ... | 192.168.1.5 | N/A | N/A | - |
| ... | 192.168.1.6 | UPnP | printer | - |

551 — MAC Address
552 — IP Address
553 — Protocol type
554 — Class of apparatus
555 — active
550

| 0 | 0 | R | AT | L | VID |
|---|---|---|---|---|---|
| | | | | | NE |
| | | | | CSV [1] | |
| | | | | ... | |
| | | | | CSV [n] | |

561 — VID
562 — NE
560

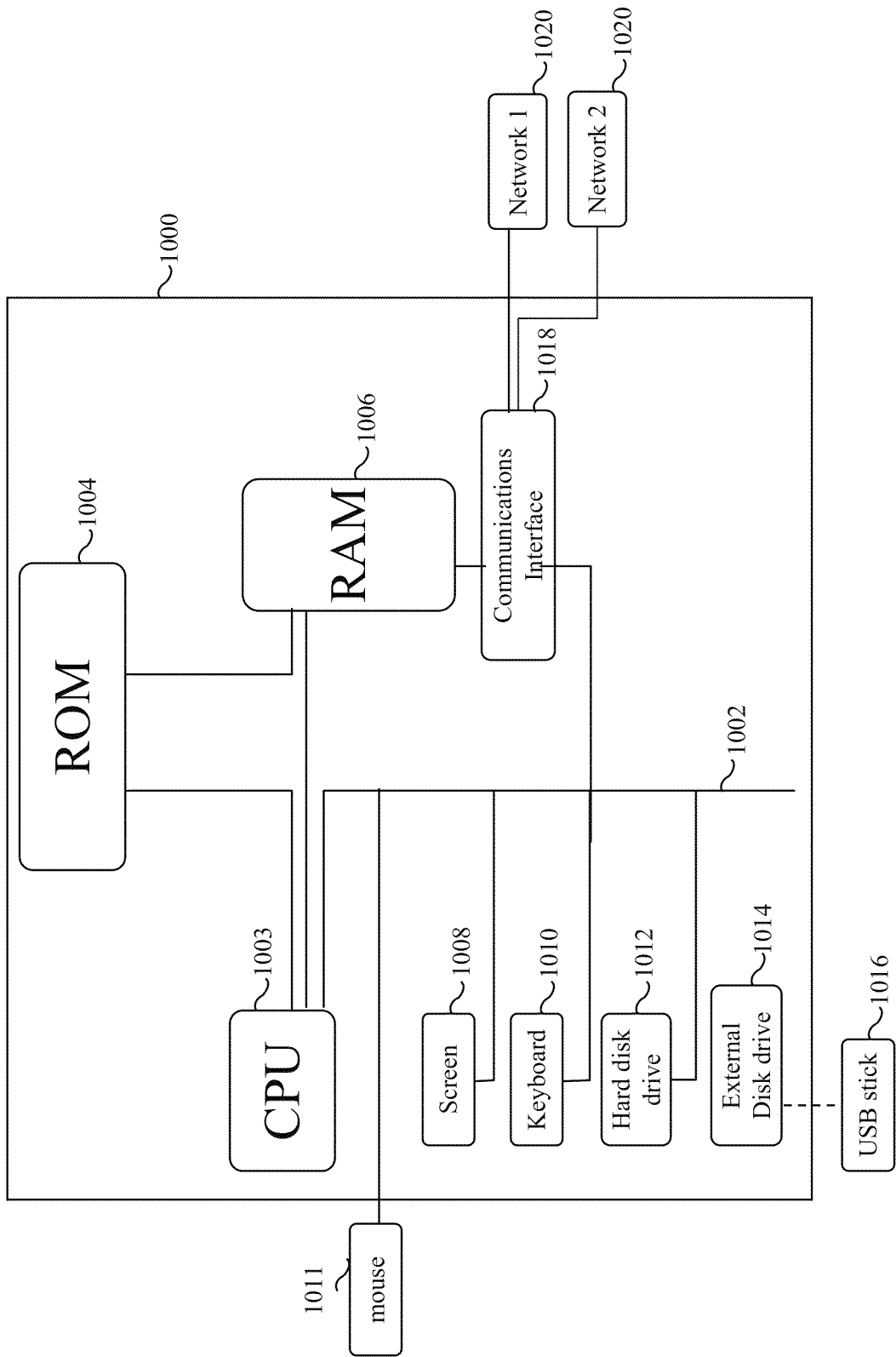

METHOD FOR MANAGING ADDRESS SPACES AT AN OPENING OF A COMMUNICATIONS TUNNEL, CORRESPONDING TUNNEL END-POINT, AND STORAGE MEANS

1. FIELD OF THE DISCLOSURE

The field of the invention is that of communications networks.

More specifically, the invention pertains to the management of address spaces, for example IP (Internet Protocol) address spaces on remote local area networks (LANs) at the setting up of a communications tunnel on a backbone network between these sub-networks.

The democratization of high-bit-rate Internet on the one hand and the appearance of audiovisual equipment made for widespread consumption and having network connectivity on the other hand is going to create new forms of user behavior. These new forms of behavior will undoubtedly involve the emergence of individuals belonging to common-interest groups (i.e. common interests such as leisure, family, etc) that we might call "permanently linked" groups. These groups will set up almost permanent connections with other individuals of a same field of interest, setting up audio and/or video communications and sharing all kinds of information (audio, video, photo, text etc).

The technology of Virtual Private Networks (VPN) is offering a worthwhile solution to this expectation. This technology enables real-time transparent communication in a secured way between individuals who share a same field of interest and, at the same time, use the Internet infrastructure which has low reliability but is inexpensive.

To communicate transparently and overcome the need for non-routable addresses, VPNs use a particular type of encapsulation known as tunneling which creates what is called a tunnel. This operation consists in encapsulating an A-level protocol (a passenger protocol) in a B-level protocol (transport protocol) by means of an encapsulation protocol C. Thus, the transport protocol processes the passenger protocol as if it were payload data.

FIG. 3, described in detail here below, presents an example of packet encapsulation in a level-2 VPN, i.e. in a level-2 tunnel (a level-2 tunnel means that the passenger protocol is a protocol of the layer 2 of the ISO model which describes the services offered by each of these layers and their interactions).

Tunneling can be used to transport a network protocol on a network that does not support it. It can also be used to provide different types of VPN functions such as for example private addressing.

Tunneling techniques are now increasingly used in remote client access functions and home local area networks (LANs).

Here below in the description, we consider, by way of an example, solely level-2 or level-3 tunnels for which the level of the transport layer B in the OSI model is equal to that of the transport layer (level-4 transport layer in the ISO model). It is clear that the context of the present invention is in no way exhaustive and that the level of the transport protocol B in the OSI model may be lower (in the case of a panel with Ethernet carrier) or higher (in the case of a time and with HTTP carrier). For example, EtherIP (described by the standard RFC 3378) and L2TP (Layer 2 Tunnelling Protocol) have been standardised by the IETF (Internet Engineering Task Force) as L2VPN (Layer 2 Virtual Private Networks) protocols, i.e. tunnelling level 2 frames over the Internet protocol.

VPN techniques are frequently used to interconnect two LANs in order to create a virtual local area network formed by the union of two original LANs. It is known that secured VPNs include a cryptography and authentication algorithm to guarantee the secrecy of the transported data. A typical VPN configuration based on a tunneling technique is illustrated in FIG. 1 (described in detail here below). In this example, the tunnel end-points are not integrated into the gateways. The tunnel is set up between two tunnel end-points and each packet (also called a frame) sent to an apparatus connected to the remote LAN is encapsulated by the local tunnel end-point and then sent to the remote tunnel end-point which will de-encapsulate it and send it on the remote LAN. For the apparatuses of the local and remote LANs interconnected by a tunnel, they are virtually connected to a same LAN. A communication between two apparatuses through the tunnel is called end-to-end communication.

The "Universal Plug and Play" standard (here below designated as the UPnP standard, promulgated by the UPnP forum) is aimed at enabling systems and apparatuses to be placed in networks and to work together in a simple and efficient manner without preliminary configuration.

Apparatuses compatible with the UPnP standard are especially audio-video devices and personal computers (PCs) manufactured by various companies. These apparatuses can be integrated into a local IP network such as a LAN. The UPnP standard provides a compatible apparatus with means of dynamic connection to an UPnP network (implementing the UPnP standard) enabling it to discover the other compatible apparatuses of the network and enabling it to communicate (or reveal) its own capacities. The UPnP technology is based on the TCP/IP (Transmission Control Protocol/Internet Protocol) network protocol, the HTTP (HyperText Transfer Protocol) and the XML ("Extensible Markup Language") protocol.

The UPnP audio visual standard, here below called the "UPnP AV" defines a set of UPnP apparatuses (for example television sets, camcorders, DVD players, MP3 players, PCs etc) with their associated services which are more specifically dedicated to the digital audio/video world.

The main three logic entities of a UPnP AV network (implementing the UPnP AV standard) are a media server or UPnP media server having access to multimedia contents which it can broadcast on the local network, a media player or UPnP media renderer capable of locally playing this type of multimedia contents received from the network and a control station co-ordinating the operations requested by the user (for example play, stop, pause etc).

The media server and the media renderer do not implement the UPnP protocol for the direct exchange of information with one another. Indeed, in order to exchange multimedia contents, they use protocols apart from the UPnP protocol (also called out-of-band protocols). These out-of-band protocols are mainly the HTTP (as defined in the RFC 2616 standard) over the TCP/IP protocol), and the RTP (Real-time Transport Protocol) as defined in the RFC 1889 standard, over the UDP (User Datagram Protocol).

UPnP technology was envisaged in the context of deployment on a local LAN (Local Area Network). Before the emergence of personal or domestic local area networks connected to WANs (Wide Area Networks) working at high bit rates such as the Internet, a need developed for connecting local area networks together. As referred to here above, Virtual Private Networks (VPNs) provide a worthwhile approach to meeting this demand.

L2VPN technologies are becoming increasingly widespread in homes owing to L2VPN type software programs or L2VPN dedicated network packs by which anyone can make a direct and transparent connection between the apparatuses of each home network.

Unlike professional networks, home networks are interconnected dynamically, and these networks are not administered (the user does not have the requisite knowledge).

The DHCP (Dynamic Host Configuration Protocol) is a network protocol whose role is to ensure the automatic configuration of the IP parameters of a station of the network, especially by automatically assigning it an IP address and a mask of sub-networks when it is started up.

This DHCP was presented for the first time in October 1993 and is defined by the RFC 1531 standard, modified and complemented by the RFC 1534, 2131 and 2132 standards. This DHCP works on the client-server model. A server which has a policy of assigning IP configurations sends a given configuration for a given period of time to a given client (typically a machine that has just started). The server will serve as a base for all the DHCP queries (it receives them and responds to them). In order that a DHCP server may be used to allocate IP addresses, it must be given a reservoir of addresses from which it can draw, this reservoir being better known as an address space. An address space is constituted by a set of address ranges, an address range being a set of addresses. It must be noted that it is possible to define several ranges which may be disjoint or contiguous.

When a machine has just started operation, it does not have any network configuration (no default configuration), and yet it must be able to send a message on the network in order to have a real configuration assigned to it from a set of parameters enabling the machine to communicate on the network. The technique used is called broadcasting. To find a DHCP and enter into dialogue with it, the machine will simply send out a broadcast burst or packet to an IP address 255.255.255.255 and on the local network. This broadcast burst has a corresponding DHCPDISCOVER message whose purpose is to locate the available DHCP servers and ask them to provide parameters of a first configuration. This particular broadcast burst is received by all the machines connected to the network. When the DHCP receives this burst or packet, it responds with another broadcast burst containing all the information required for the configuration. This other broadcast burst has a corresponding DHCPOFFER message containing the first parameters of the first configuration. If the machine accepts the parameters of the configuration, it sends back a packet to inform the server that it is keeping the proposed parameters. This is done by means of a DHCPREQUEST message from the client with preservation of the first proposed parameters. If not, the machine makes a new request using a DHCPREQUEST message from the client with new parameters.

When several DHCP servers are used on a same segment, the intersection of the address spaces and ranges of the different servers must be vacant, failing which there will be ambiguity in the assignments and renewals. Indeed, unpredictable and undesirable disturbances in the routing of the network data will occur if several network machines are using a same IP address.

A noteworthy point is the fact that a DHCP server is embedded in gateway equipment provided by the Internet service providers, and that the default-configured address spaces are in most cases the same. Indeed, in Internet nomenclature, a private network is a network using an address space defined by the RFC 1918 "private IP address" standard and is not connected to the public Internet system. It follows from this that the same private IP addresses can be used on distinct LAN networks. The address space of a DHCP server must consist of a set of addresses included among the following three address ranges: from 10.0.0.0 to 10.255.255.255, from 172.16.0.0 to 172.31.255.255, and from 192.168.0.0 to 192.168.255.255.

To resolve this problem of intersection of the address spaces of the different servers, most DHCP servers now implement a conflict detection (or server conflict detection) function enabling each DHCP server to ascertain that the address which it wishes to assign to one of its client apparatuses is not being used by another machine of the network. When all the DHCP servers of a same network implement this function, their address spaces may overlap. Furthermore, it is also specified that a client station can verify the duplication of the existence of an IP address during reception of a proposal by the DHCP server, in which case the client declines the proposal made to it. An IETF document better known as the "IPv4 ACD" (IPv4 Address Conflict Detection) document specifies the modalities of application (number of tests to be performed, waiting period for a response from a possible other client station etc).

In the example of FIG. 1, the level 2 tunnel end-points are not embedded in the gateway apparatuses proposed by the Internet access providers. Typically, these tunnel end-points are implemented on PC stations having L2VPN software tools or on L2VPN dedicated packages connected to each home network.

Thus, the use of these tools for linking up home networks poses a problem of address conflict between the apparatuses of each distinct network. Indeed, the dynamic and random aspect of the interconnection of such networks of personal relationships does not enable advance prediction of the address spaces adapted to each DHCP server because there is no static configuration that meets all the cases of interconnection. Again, the DHCP server conflict detection function is efficient in the case of new apparatuses appearing on a network, but does not meet the problem of association of the level 2 networks having network apparatuses already active (and therefore already having an IP address that is potentially in conflict with the other apparatuses of the remote LAN).

2. TECHNOLOGICAL BACKGROUND OF THE DISCLOSURE

There are various techniques known in the prior art enabling communications between the devices of the Internet and the apparatuses of a private local area network.

First of all, the NAT (Network Address Translator) mechanism of the RFC 3489 standard implemented on an Internet gateway makes the non-routable internal IP addresses of a local LAN correspond to a set of unique and routable external IP addresses. This mechanism can be used especially to make a single public external address visible on the Internet correspond to all the addresses of a private network, and thus mitigate the shortfall of Internet IPv4 addresses. In principle, when the internal address sends out a frame that goes through the router/gateway implementing the NAT mechanism, this address is replaced in the header of the TCP/IP packet by its external IP address. The reverse replacement will be done when a frame whose destination address is this external address is received from the Internet; the external address is then translated into an internal IP address by the Internet gateway.

This mechanism is particular designed in a traditional client/server context of the Internet. Indeed, a major problem arises when a communications protocol (for example UPnP protocol) transmits the source host IP address into the data payload part of the conveyed packet. Since this address is not valid after it has crossed the NAT router, it cannot be used by the destination machine. To overcome this drawback, the NAT routers must inspect the content of the packets that go through them and replace the specified IP addresses by the translated addresses.

However, this implies knowledge of the format of the protocol, and the computation of the checksum and the length of the packet.

Furthermore, this mechanism is very cumbersome in terms of computation load because each packet is analysed and subject to modification. Apart from an increase in the consumption of resources within the NAT router, an increase is observed in the transmission latency of the router.

A more developed mechanism has subsequently appeared. This is the ALG (Application-Level Gateway) mechanism under the RFC 2663 standard similar to a proxy server. Through the principle of inspection of all the packets travelling through the ALG device, this ALG service converts the network information found (IP addresses and TCP/UPD ports) in the data payload part of each packet. It must be noted that this implies that the ALG is given a particular configuration so as to support a precise communications protocol according to a precise version.

For example, the "UPnP remote access" study group has made efforts to define a UPnP architecture having an ALG mechanism of this kind available so as to enable an distant terminal apparatus to get connected to the first local home network and interact with the other UPnP devices of the first local network as if it were physically attached to this first local area network.

Furthermore, this mechanism is very cumbersome in terms of computation load because each packet is analysed and subject to modification.

In the context of a VPN connection between two remote networks such as home networks, the data transferred between these two dwellings is most usually of the audio/video type. Thus, VPN architectures based on the above-mentioned mechanisms can no longer be used to ensure appropriate QoS (Quality of Service) for these audio/video exchanges because the proxy element introduces non-negligible additional latency and jitter into communications travelling through the VPN tunnel.

A HITACHI patent application (US 2007/0127461) entitled "Router and Communications System" proposes a solution that does not use any proxy server between two distinct networks.

The context of this patent application is that of a level 2 tunnel (L2VPN) connecting two remote LANs. Owing to the transparency of the tunnel relative to level 2 protocols (all the level 2 messages are conveyed directly), this patent proposes a method to unify the addressing system between the two connected LANs.

Using a mechanism for distributing information on an allocation of IP addresses for a network and on a filtering of MAC addresses, a master router informs the remote router of the configuration that has to be set up when a tunnel is opened. These pieces of information form part of the message requesting establishment of the tunnel. The pieces of IP address information are used by the remote router to distribute these addresses to the apparatuses of its network. The pieces of MAC (Medium Access Control) address information are used by the remote router to filter the level 2 messages in the case of a multiple-tunnel configuration.

It must be noted that the approach described in the HITACHI patent document (US 2007/012746) partially resolves the problem of conflict of addresses in the context of an L2VPN for apparatuses that have newly started after the setting up of the tunnel. Indeed, in this HITACHI patent document, the router allocates an accurate IP address to the apparatus that has been put into operation. With respect to the DHCP server conflict detection function stipulated by the DHCP standard, the sole advantage of this solution is that it provides a clear separation between the address spaces of each DHCP server.

However, this HITACHI patent document is based on the postulate that every machine of the LAN is off before the tunnel has been set up and will be restarted after the opening of the tunnel. This is not realistic especially in an open-ended context of a VPN connection between non-permanent home networks. Thus, this HITACHI patent document does not propose any solution for managing network apparatuses that are already working when the L2VPN tunnel is set up.

It must also be noted that this HITACHI patent document entails the assumption that the DHCP service and the L2VPN router are implemented by the same machine. The HITACHI patent document is therefore not capable of controlling commercially available DHCP servers.

3. GOALS OF THE DISCLOSURE

The invention, in at least one embodiment, is aimed especially at overcoming this drawback of the prior art.

More specifically, it is an aim of the invention in at least one embodiment of the invention to provide a technique for overcoming the problem of address conflict (for example IP address conflict) between two sub-networks connected by a communications tunnel in proposing an efficient method of dynamic management of address spaces of each sub-network implemented by a tunnel end-point at the detection of a request for a linking up of the two sub-networks by a tunnel.

It is a goal of the present invention especially to provide a technique enabling the prevention, during the setting up of the tunnel (for example the L2VPN tunnel) between two sub-networks, of address conflicts (for example IP) when network elements already working in these sub-networks.

It is another goal of the invention to provide a technique for the prevention, when the tunnel is set up, of address conflicts, and to do so without necessitating any proxy service between the two sub-networks.

It is another major goal of the invention to enable an automatic organisation of the total communications network without necessitating any form of administration by a user.

It is another goal of the invention to provide a technique that is simple to implement at low cost.

4. SUMMARY OF THE INVENTION

One particular embodiment of the invention proposes a method for managing address spaces when setting up a communications tunnel between a first tunnel end-point of a first communications sub-network and a second tunnel end-point of a second communications sub-network distinct from said first sub-network, to each apparatus connected to a given sub-network among said first and second sub-networks being allocated an address included in an address space associated with said given sub-network.

This method is performed by the first tunnel end-point and is remarkable in that it comprises the following steps:
  detecting at least one pair of apparatuses to which a same address is allocated, each pair of apparatuses comprising a first apparatus of the first sub-network and a second apparatus of the second sub-network;
  selecting at least one apparatus of each pair of apparatuses;
  allocating a new address to each selected apparatus; and setting up the tunnel between the first and second sub-networks.

Thus, in this particular embodiment, the invention relies on a wholly novel and inventive approach to the dynamic management of the address spaces of each sub-network implemented by a tunnel end-point at the detection of a request for the linking up of two sub-networks by a tunnel.

Through this method of management, before the tunnel is set up (i.e. before any communications are authorised between client apparatuses of the two sub-networks other than the first and second tunnel end-points), it is possible, using knowledge of the configuration of each sub-network, to detect the doubles of addresses (i.e. identical addresses allocated to two apparatuses on either side of the tunnel) and eliminate these doubles by re-allocating a new address to at least one of the two apparatuses concerned by each double.

Thus, the present invention proposes a complete solution to the problem of address conflict and does so even for network apparatuses already working on their own network when the tunnel is set up.

In particular, this management method furthermore enables an automatic organisation of the global network without calling for any administration by the user.

Advantageously, the step of allocating a new address comprises steps of:
  obtaining a number of addresses that are included in the address spaces associated with said first and second sub-networks and that are not yet allocated to an apparatus of said first and second sub-networks;
  comparing said number of addresses with the number of selected apparatuses;
  if said number of addresses is smaller than the number of selected apparatuses, extending at least one of the address spaces associated with said first and second sub-networks in order to make said number of addresses greater than or equal to the number of selected apparatuses.

Thus, through an analysis of the free addresses in each of the address spaces of the first and second sub-networks and, as the case may be, by updating said address spaces so that the totality of the doubled addresses can find a replacement address, the modified address space or spaces are configured so as to ensure the efficient functioning of the phase of allocating a new address to each selected apparatus.

Advantageously, the step of extending at least one of the address spaces comprises at least one of the following steps:
  extending the address space of at least one active address server of one of said first and second sub-networks;
  starting a new address server possessing an address space, the addresses of which are distinct from the addresses of the address spaces of the already active address servers of said first and second sub-networks.

Thus, there are two ways available to carry out the extension that can be used either separately or in combination.

In the case of a combination, for example in the event of a failure of a configuration of the address servers of the first and second sub-networks, one alternative solution for the extension step consists in starting a new server on the first tunnel end-point, this new address server having an address space that is complementary to the address spaces of the already active address servers of the first and second sub-networks.

Thus, the allocation of the new addresses can be done by avoiding any problem related to an address conflict.

According to an advantageous characteristic, the step of allocating a new address is preceded by a step of modifying a filtering configuration of the first tunnel end-point to perform a first filtering operation enabling only messages pertaining to an address allocation to be allowed to be transmitted between the first and second sub-networks via the tunnel, and in that the step of setting up the tunnel is preceded by a step of modifying the filtering configuration of the first tunnel end-point according to the new address or addresses allocated to the selected device or devices.

Thus, the passage on the tunnel is limited solely to address allocation protocol messages designed to resolve address conflict situations as well as to tunnel management messages exchanged between the first and second tunnel end-points. Thus, the allocation of new addresses (to eliminate already detected address conflicts can be done comprehensively in taking account of the apparatuses of the two sub-networks.

According to another advantageous characteristic, the step of allocating a new address comprises a step of updating an access gateway, for the first sub-network to access a backbone network, according to the new address of each selected apparatus.

Thus, once the new addresses have been determined for the selected apparatuses, this updating step ensures the compliance of the configuration of the Internet gateway with the new network configuration, following the allocation of a new address to the selected apparatuses.

Again, the step of allocating a new address comprises steps of:
  determining, among the selected apparatus, an apparatus still in conflict, which is an apparatus to which a new address has not been allocated;
  modifying the filtering configuration of the first tunnel end-point to perform a second filtering operation so as not to allow a transmission via the tunnel of the messages relating to said apparatus still in conflict.

This second filtering step thus allows the transit on the tunnel of all the communications of the first sub-network and of the second sub-network for each apparatus whose address is not in a conflict of address or is no longer in a conflict of address with another apparatus.

Advantageously, the step of detecting at least one pair of apparatuses possessing a same address comprises steps of:
  obtaining a first address allocation table within the first sub-network;
  obtaining a second address allocation table within the second sub-network;
  detecting said at least one pair of apparatuses possessing a same address, by comparison of said first and second address allocation tables.

Thus, through these two address allocation tables, each pair of apparatuses undergoing conflict of addresses can easily be determined.

Advantageously, the step of detecting at least one pair of apparatuses possessing a same address comprises steps of:
  obtaining a first address allocation table within the first sub-network;
  transmitting a polling message to the second tunnel end-point for polling the second sub-network for each address of said first address allocation table;
  detecting said at least one pair of apparatuses possessing a same address, by analysis of a response message to the polling message.

Thus, if the second tunnel end-point is not able to create its own address allocation table, the first tunnel end-point implements an address polling mechanism by which it is possible to detect possible conflicts of addresses prior to the establishment of a communications channel between these two tunnel end-points.

According to another advantageous characteristic, the step of selecting at least one apparatus from each pair of apparatuses is performed as a function of at least one rule belonging to the group comprising the following rules:
  an apparatus that is not an access gateway for accessing a backbone network is selected if a pair of apparatuses comprises one such apparatus,
  an apparatus that is of a client-type is selected if a pair of apparatuses comprises one such apparatus,
  an apparatus that does not have any communications activity on the network is selected if a pair of apparatuses comprises one such apparatus;
  an apparatus that is not included in a pre-determined list of apparatuses whose addresses do not have to be modified is selected if a pair of apparatuses comprises one such apparatus.

Thus, according to one particular embodiment of the invention, the selection of the apparatuses to which the correction of the addresses in conflict will be applied is done so as to bring about the least possible disturbance in the behaviour of the first sub-network and second sub-networks.

In another embodiment, the invention pertains to a computer program product downloadable from a communications network and/or recorded on a computer-readable carrier and/or executable by a processor. This computer program product comprises program code instructions for the implementation of the above-mentioned method (in any one of its different embodiments) when said program is executed on a computer.

In another embodiment, the invention relates to a computer-readable storage means, storing a computer program comprising a set of instructions executable by a computer to implement the above-mentioned method (in any one of its different embodiments).

The invention also concerns a device for managing address spaces when setting up a communications tunnel between a first tunnel end-point of a first communications sub-network and a second tunnel end-point of a second communications sub-network distinct from said first sub-network, to each apparatus connected to a given sub-apparatus among said first and second sub-networks being allocated an address included in an address space associated with said given sub-network. This device is remarkable in that the first tunnel end-point comprises:
  first means for detecting at least one pair of apparatuses to which a same address is allocated, each pair of apparatuses comprising a first apparatus of the first sub-network and a second apparatus of the second sub-network;
  means for selecting at least one apparatus of each pair of apparatuses;
  means for allocating a new address to each selected apparatus; and
  means for setting up the tunnel between the first and second sub-networks.

Advantageously, the means for allocating a new address comprise:
  first means for obtaining a number of addresses that are included in the address spaces associated with said first and second sub-networks and that are not yet allocated to an apparatus of said first and second sub-networks;
  means for comparing said number of addresses with the number of selected apparatuses;
  first extending means for extending at least one of the address spaces associated with said first and second sub-networks in order to make said number of addresses greater than or equal to the number of selected apparatuses, said first extending means being activated if said number of addresses is smaller than the number of selected apparatuses.

Advantageously, said first means for extending comprise:
  second extending means for extending the address space of at least one active address server of one of said first and second sub-networks;
  means for starting a new address server possessing an address space, the addresses of which are distinct from the addresses of the address spaces of the already active address servers of said first and second sub-networks.

According to an advantageous characteristic, this device comprises first means for modifying a filtering configuration of the first tunnel end-point to perform a first filtering operation enabling only messages relating to an address allocation to be allowed to be transmitted between the first and second sub-networks via the tunnel, and wherein it comprises second means for modifying a filtering configuration of the first tunnel end-point according to the new address or addresses allocated to the selected device or devices.

Furthermore, the allocation means comprise means for updating an access gateway, for the first sub-network to access a backbone network, according to the new address of each selected apparatus Interestingly, the allocation means further comprise:
  means for determining, among selected apparatus, an apparatus still in conflict, which is an apparatus to which a new address has not been allocated;
  third means for modifying the filtering configuration of the first tunnel end-point to perform a second filtering so as not to allow a transmission via the tunnel of the messages relating to said apparatus still in conflict.

Advantageously, the first means for detecting at least one pair of apparatuses possessing a same address comprise:
  second means for obtaining a first address allocation table within the first sub-network;
  third means for obtaining a second address allocation table within the second sub-network;
  second means for detecting said at least one pair of apparatuses possessing a same address, by comparison of said first and second address allocation tables.

The first means for detecting at least one pair of apparatuses possessing a same address also comprise:
  second means for obtaining a first address allocation table within the first sub-network;
  means for transmitting a polling message to the second tunnel end-point for polling the second sub-network for each address of said first address allocation table;
  fourth means for detecting said at least one pair of apparatuses possessing a same address, by analysis of a response message to the polling message.

5. BRIEF DESCRIPTION OF THE DRAWINGS

Other features and advantages of embodiments of the invention shall appear from the following description, given by way of an indicative and non-exhaustive example, and from the appended drawings, of which:

FIG. 5 is a schematic illustration of the structures of the data exchanged according to a particular embodiment of the invention;

Figure 7:
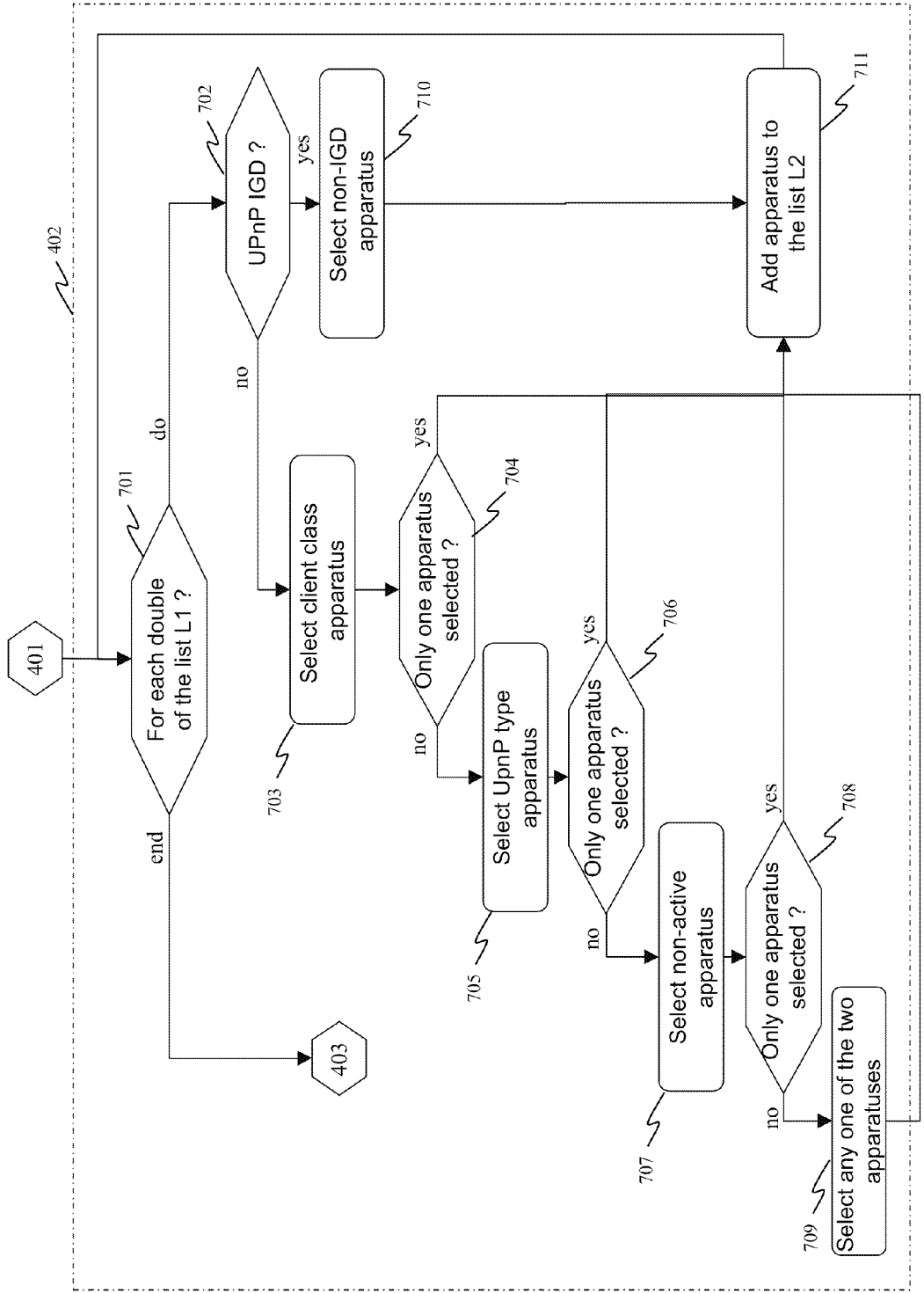
Figure 8:
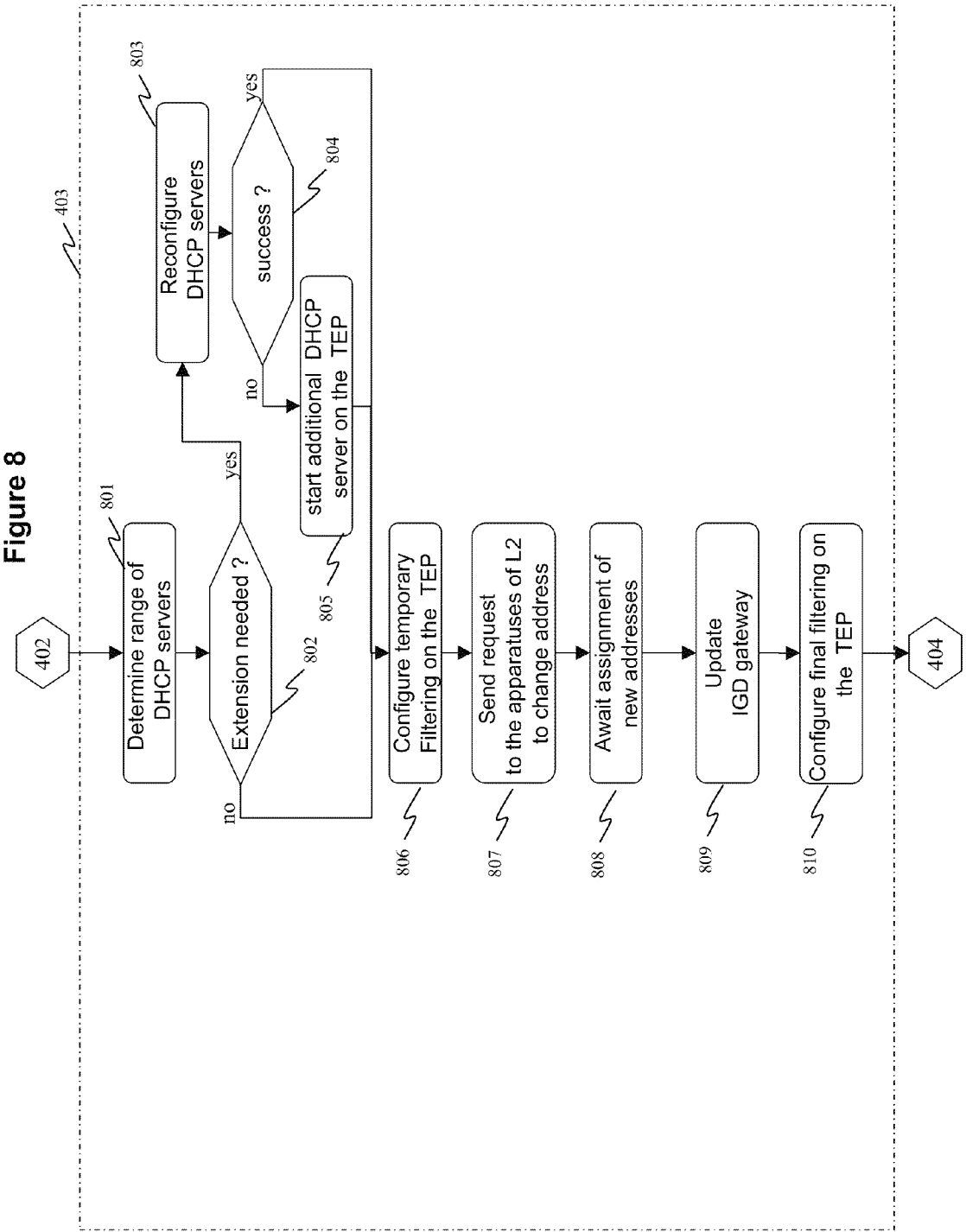

FIG. 7 provides a schematic illustration of an algorithm for the selection of apparatuses that are candidates for a modification of addresses according to a particular embodiment of the invention;

FIG. 8 provides a schematic illustration of an algorithm for modifying the network configuration, applied to the selected apparatuses;

FIG. 9 is a schematic illustration of a device according to a particular embodiment of the invention.

6. DETAILED DESCRIPTION OF ILLUSTRATIVE EMBODIMENTS

Figure 1:
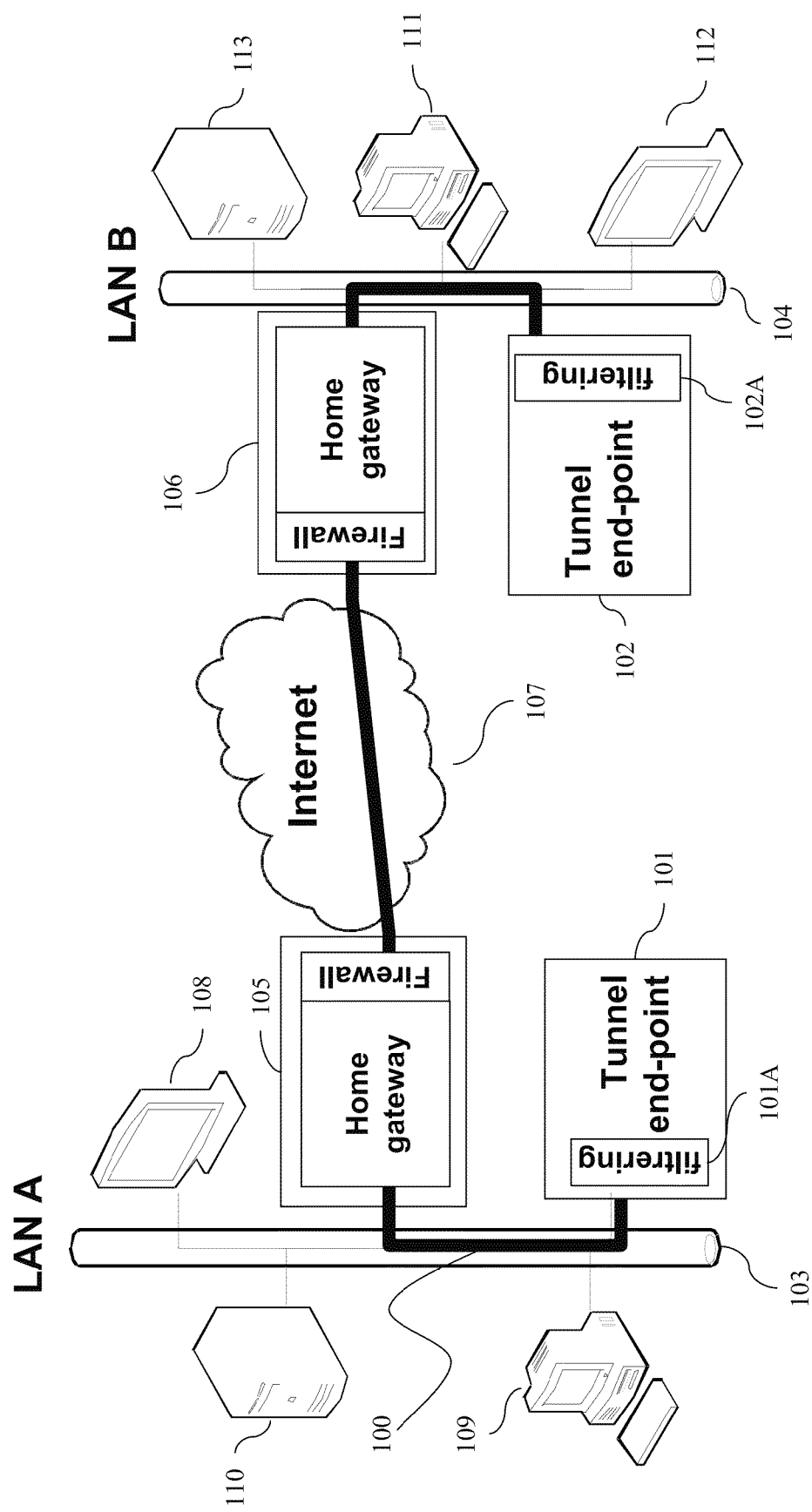
FIG. 1 illustrates a typical virtual private network (VPN) for the implementation of the invention according to a particular embodiment.

FIG. 1 is a schematic illustration, according to a particular embodiment of the invention, of a typical configuration of a virtual private network (VPN) implementing a communications tunnel 100 between a first local tunnel end-point 101 and a second remote tunnel end-point 102, through a backbone communications network 107 such as the Internet for example. This tunnel 100 connects a first communications sub-network 103 and a second communications sub-network 104, also respectively called LAN A and LAN B respectively. The first sub-network 103 and the second sub-network 104 each have has a home Internet gateway type high-bit-rate Internet access apparatus, capable of integrating a firewall) 105 and 106, PC type apparatuses 109 and 111, servers 110 and 113 for the storage and sharing of the digital media (of the audio, video and photo type) as well as digital media rendering apparatuses 108 and 112. A tunnel end-point may be integrated into an audiovisual apparatus such as a digital television set. It can also be presented in a PC type apparatus in the form of a program performing the functions associated with it.

Once the tunnel 100 is set up, the apparatuses 108, 109, and 110, connected to the first sub-network 103, are capable of communicating with the apparatuses 111, 112 and 113, connected to the second sub-network 104. For example, the local client 108 connected to the first sub-network 103 can communicate with the server 113 connected to the second sub-network 104.

This FIG. 1 shows a simple communications network with only one tunnel, but it is understood that a same tunnel end-point may have to manage several tunnels (leading to an equivalent number of tunnel end-points) to interconnect a first LAN sub-network to several other LAN sub-networks. Furthermore, for the sake of simplification, the figure does not show the infrastructure apparatuses in the Internet such as Internet routers.

The first tunnel end-point 101 (or second tunnel end-point 102) is formed chiefly by two ports for communications with the first sub-network 103 (or second sub-network 104), namely an input port and an output port. In practice, these two ports have a same Ethernet-type two-way physical interface (network ports 1020 of FIG. 9).

These two ports are connected to the transport channel of the tunnel connecting the first sub-network 103 and the second sub-network 104. The first tunnel end-point 101 (or second tunnel end-point 102) comprises a filtering module 101A (and 102A respectively) in order to control the transmission of frames between the first sub-network 103 and second sub-network 104. This filtering module 101A (or 102A) is contained in the applications module 200, described here below with reference to FIG. 2.

At the arrival of the Ethernet frames of the first sub-network 103 of the local area network, the filtering agent 101A is in charge of applying the filtering steps whose configurations are described in detail with reference to the steps 601, 604, 806 and 810 of FIGS. 6 and 8 described in greater detail here below. If the input frame does not concern a level 2 or level 3 stream which, after the configuration of the applied filtering must be blocked, this Ethernet frame is given to the multiplexer 101A in order to be encapsulated and sent in the tunnel.

If the input frame concerns the selected TCP stream, the filtering agent destroys this frame.

Similarly, the filtering agent is capable of filtering the frames coming from the tunnel in order to limit their broadcasting on the local network if necessary.

Figure 2:
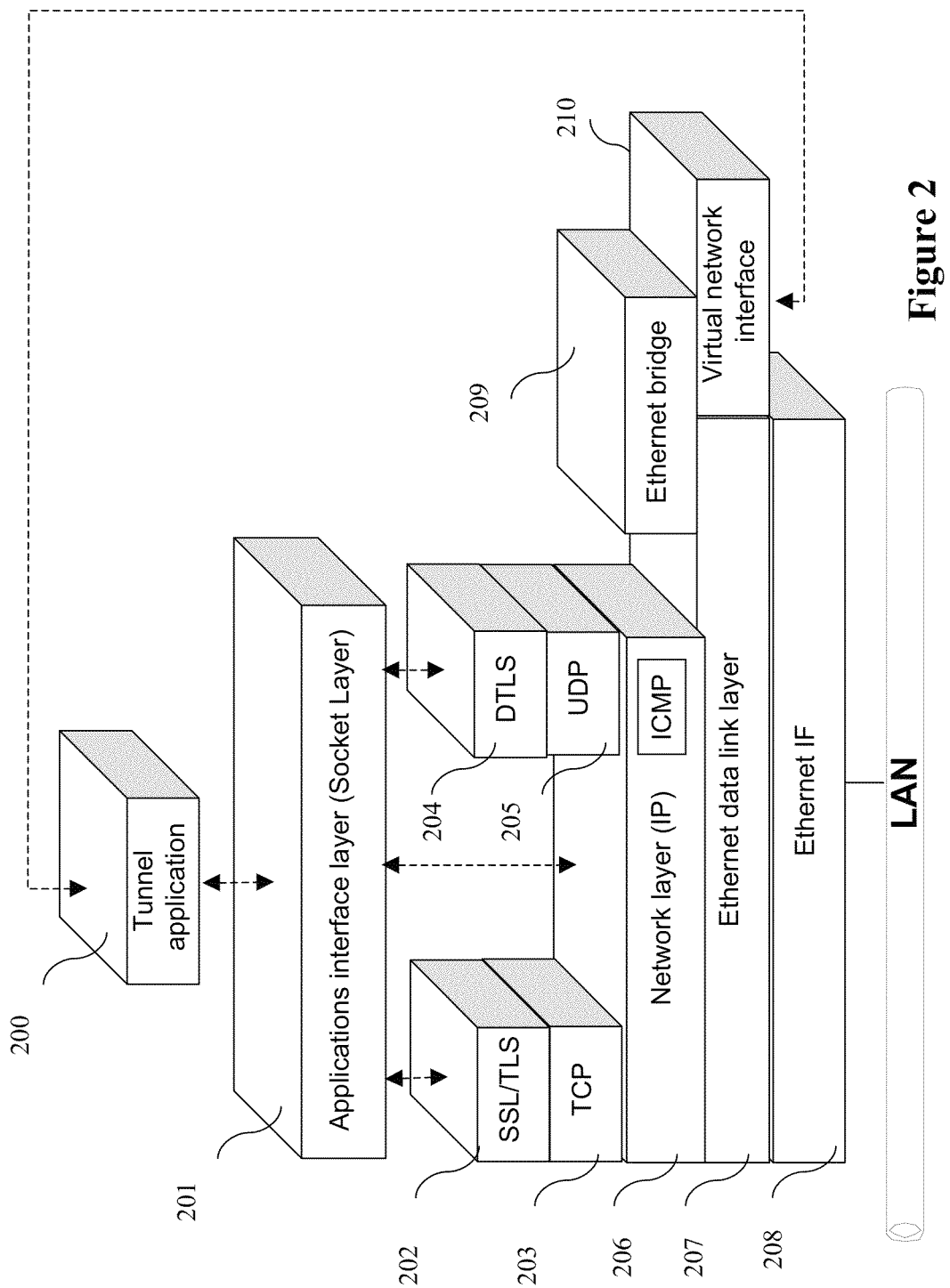
FIG. 2 is a schematic illustration of an example of a classic layered model of a tunnel end-point in which the method of the invention is implemented according to a particular embodiment.

Referring to FIG. 2, we shall now present the routing of an Ethernet frame that comes from one of the apparatuses 108, 109, 110 connected to the first sub-network 103 and entering the tunnel 100. To this end, a layered model is used. This layered model describes the protocol layers needed for the implementation of this tunnel 100. In this model, the protocol elements necessary for functions other than the use of the tunnel are not represented. For example, the protocol elements associated with an UPnP architecture, when a first tunnel end-point 101 is integrated into a UPnP apparatus, are not shown.

The first tunnel end-point 101 has a Ethernet physical interface 208 which hands over the Ethernet frames coming from one the apparatuses 108, 109, 110 to the link layer 207 for routing: this routing is done toward the network layer 206, for the Ethernet frames intended for the apparatus comprising the tunnel end-point or toward the bridge layer 209 for the other Ethernet frames. The bridge layer 209 carries out the classic operations of an Ethernet bridge such as the filtering of Ethernet frames and the relay of these frames to the appropriate Ethernet output port or ports. The bridge has an Ethernet interface 207 and at least one virtual interface 210, simulating an Ethernet controller, attached to it. A virtual interface 210 is created for each tunnel instantiated by the application 200 to which it gives the Ethernet frames that must travel in transit on the respectively instantiated tunnels. Generally, the protocol of encapsulation of the tunnel represented by the application 200 performs the operations necessary for implementing each tunnel, among them in particular configuration, filtering and encapsulation (formation of a tunnel packet) and the extraction of a frame.

The frames received from the virtual interface 210, after processing by the application 200, are handed over in the form of a packet through an applications interface or socket 201 to a reliable TCP transport protocol 203 or to a non-reliable UDP transport protocol 205, respectively secured by the SSL protocol 202 and the DTLS protocol 204. After processing by a transport protocol to form the tunnel packet, this packet is passed on to the network layer 206. The IP datagram thus formed with the current packet can then be transmitted on the LAN sub-network through the link layer 207 and physical layer 208.

The reception of a frame coming from the tunnel 100 will follow a path in the tunnel end-point that is in reverse to the path presented here above.

Figure 3:
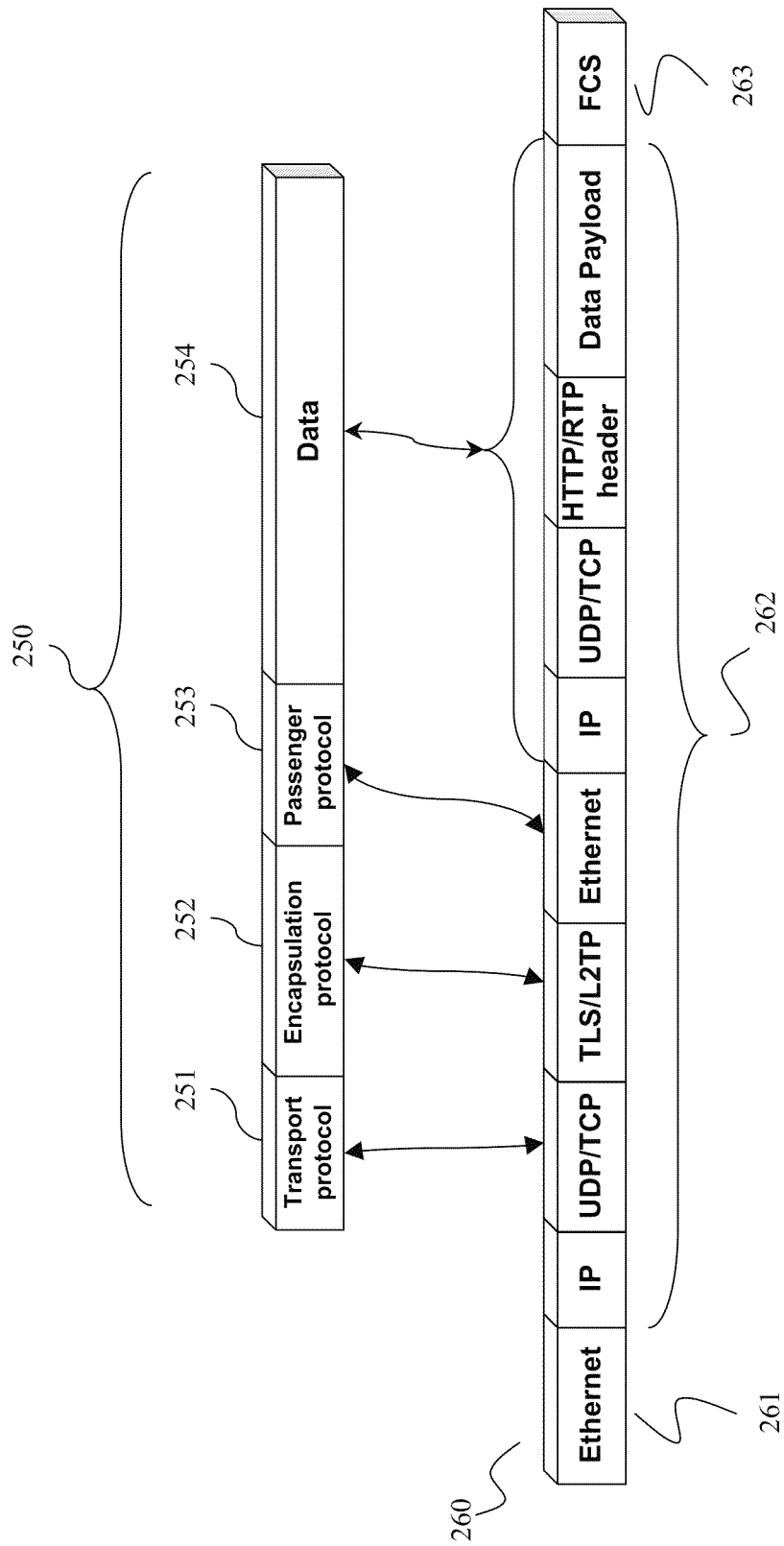
FIG. 3 is a schematic illustration of an example of a classic format of an Ethernet frame conveying a level 2 tunnel packet.

FIG. 3 shows an example of a classic format of an Ethernet frame 260 in transit for example on the first sub-network 103 of figure of FIG. 1 between the first tunnel end-point 101 and the home gateway 105 (to be sent on the Internet or received from the Internet). This Ethernet frame comprises an Ethernet header field 261, a first IP datagram itself conveying a level 2 tunnel packet 250 and an FCS (Frame Check Sequence) field.

The tunnel packet 250 has four parts:

a transport protocol header field 251 (i.e. a TCP or UDP field in this example), a header field of the encapsulation protocol 252 (i.e. L2TP or TTLS in this example, described especially in the following documents "IETF RFC3931, "Layer two tunneling protocol—version 3 (L2TPv3)", J. Lau et al, March 2005>> and <<IETF RFC2246, "The TLS Protocol Version 1.0">>), a header field of the passenger protocol 253 (namely Ethernet in this example);

a user data field 254 which itself comprises a second full IP datagram if no fragmentation has taken place in transit from the source apparatus.

Figure 4:
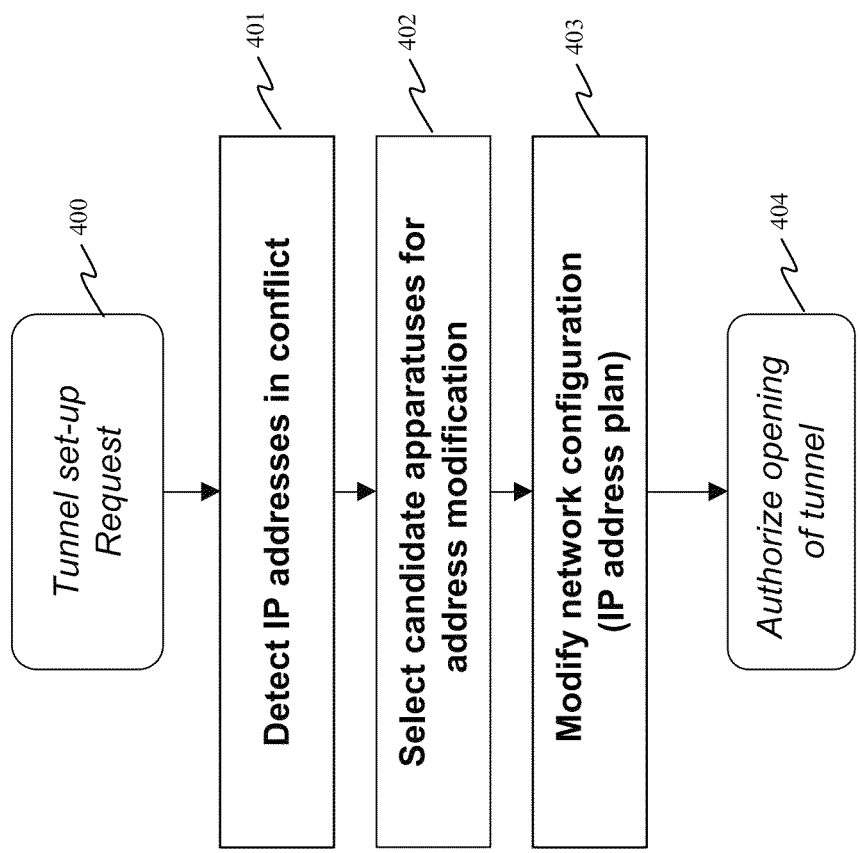
FIG. 4 is a schematic illustration of the main steps of a particular embodiment of the invention in accordance with the exemplary configuration of FIG. 1.

FIG. 4 provides a schematic view of the different steps implemented according to the particular embodiment of the invention with reference to FIG. 1.

Here below in the description, the algorithms of the invention (described in greater detail here below) are implemented for example by the first tunnel end-point 101 of FIG. 1, each of the tunnel end-points of FIG. 1 (101 or 102) being capable of executing the invention.

The algorithms of the invention are preferably set up following the detection, in a step 400, of a request for opening a L2VPN connection between two remote LANs. For example, the algorithms of the invention are set up by the tunnel end-point receiving a request for setting up the tunnel according to the known L2VPN protocol.

A request for setting up an L2VPN tunnel may come from the local network. Hence, it is deemed to be the case that the second tunnel end-point 102 receiving this local request will execute a request for setting up an L2VPN tunnel leading to a remote first tunnel end-point 101 according to the L2VPN protocol. It is therefore the first tunnel end-point 101 which is in charge of setting up the algorithms of the invention.

It must be noted that any tunnel end-point of the invention is capable of determining whether the remote tunnel end-point supports the algorithm of the invention and, by default, if it is the only algorithm to implement the invention, the tunnel end-point of the invention will execute the algorithms of FIG. 4.

Here below, the algorithms of FIG. 4 are executed by the first tunnel end-point 101.

The step 401 consists in determining a list of apparatuses subject to address conflict. This step 401 is described here below with reference to FIG. 6.

Preferably, a subsequent optional step 402 consists in making a choice, among the apparatuses in conflict, of those apparatuses for which it is necessary to change the IP address in order to limit the impacts of an address re-allocation on the communications in progress. This step 402 is described here below with reference to FIG. 7.

Then, in a step 403, the chosen apparatuses are asked to change their IP address and, once these changes are made, to update the configuration of the network in accordance with the address changes made. This step 403 is described here below with reference to FIG. 8.

If the set of steps 401, 402 and 403 is done successfully, in a step 404 the opening of a tunnel is authorised for the communications between the apparatuses of the two associated LANs.

In a preferred embodiment, should conflicts of address persist, the step 403 is adapted to blocking the communications on the tunnel for apparatuses for which the conflicts of address have not been corrected.

FIG. 5 provides a schematic illustration, in a particular embodiment of the invention, of the structure of the data used in the context of the invention.

Here below in the description, it is deemed to be the case that a tunnel end-point implementing the method of the present invention is adapted to detecting the presence of apparatuses on its local area network and of recording an input (proper to each detected apparatus) in a table of apparatuses 550 (described with reference to FIG. 5).

For example, the classic means used for the discovery of apparatuses and services in a local area network are discovery protocols among the following:

the "Bonjour" protocol, formally known as the "Rendezvous" protocol is an implementation by Apple of the "Zeroconf" or Zero Configuration Networking standard (described in the RFC 3927 standard) of the IETF. "Zeroconf" is a method of service discovery on a local area network. It is currently used to find shared printers and files but also Internet and FTP servers.

"SSDP" (Simple Service Discovery Protocol) used in the UPnP. For example, when a machine tries to find the services available on the local area network, it sends a discovery message to the broadcasting address 239.255.255.250 on the port 1900 through the UDP protocol. This message contains a header similar to an HTTP request:
M-SEARCH*HTTP/1.1
HOST: 239.255.255.250:1900
MAN: ssdp:discover
MX: 10
ST: ssdp:all Once the IP address of a machine is known, the Address Resolution Protocol (ARP) of the RFC 826 standard translates this (IPv4) network layer protocol address into an Ethernet address (which is typically a MAC address).

Another approach to the discovery for the apparatuses of the network consists in directly interrogating the gateway apparatus hosting the DHCP server. Indeed, an Internet gateway compliant with the TR-64 (LAN-Side DSL CPE configuration) recommendations of the DSL forum can be discovered through the SSDP protocol from the local LAN and thus propose a UPnP-IGD interface facilitating its configuration from the local LAN.

It may be recalled that the DSL forum is a worldwide association of more than 200 firms in the telecommunications sector. Most apparatuses of the home gateway type are compatible with the recommendations of this association.

Following the broadcast of an SSDP (Simple Service Discovery Protocol) discovery message with a "search type" field having a value "ST: urn:dslforum-org:device:InternetGatewayDevice:1", only the Internet gateway responds.

An example of a discovery request is specified here below:
M-SEARCH*HTTP/1.1
MX: 10
ST: urn:dslforum-org:device:InternetGatewayDevice:1
HOST: 239.255.255.250:1900
MAN: "ssdp:discover"

As soon as the gateway responds, it provides an indication in the SSDP response of the IP address and the port used in a "location" field to obtain a description of the services offered.

An example of a response is specified here below:
HTTP/1.1 200 OK
ST: urn:dslforum-org:device:InternetGatewayDevice:1
EXT:
SERVER: pX/2.0 UPnP/1.0 Server/1.0

USN: uuid:739f75f0-a90c-4e42-ac13-2cc42d3c243e::
urn:dslforum-org:device:InternetGatewayDevice:1
CACHE-CONTROL: max-age=1209600
LOCATION: http://192.168.0.1:51004/devicedesc.xml
Content-Length: 0

The services supported by an Internet gateway compliant with the TR-064 recommendation include the "LANHostConfigManagement" service.

This service supports the obtaining of information on the apparatuses of the local LAN as well as the IP configuration of the DHCP server, by means of the following actions:

"SetAddressRange" enabling a definition of a range of addresses used by the DHCP server;

"GetAddressRange" making it possible to obtain the range of addresses used by the DHCP server;

"SetReservedAddresses" enabling the definition of a list of IP addresses marked as being reserved (i.e. not allocatable by this server);

"GetReservedAddresses" making it possible to obtain a list of I[ addresses marked as being reserved (i.e. not allocatable by this server).

It is thus possible, by combining "SetAddressRange" actions and "SetReservedAddresses" actions to define the address space of a DHCP server.

There is also another service known as "Hosts". This service provides information on each apparatus of the local LAN especially apparatuses for which an IP address has been allocated by the gateway through the DHCP protocol, but also for the apparatuses with static IP addresses through the following actions:

"GetHostNumberOfEntries" used to obtain the number of apparatuses detected;

"GetGenericHostEntry" used to obtain information read for each apparatus detected (IP address, indication if assigned by the DHCP server, MAC address, state of activity pertaining to the presence of the equipment).

Through the results coming from any one of these two modules, entries may be added to the table 550 of FIG. 5 (described by way of a non-exhaustive example).

The fields 551 and 552 respectively represent the IP and Ethernet addresses of an apparatus detected on the network.

The fields 553 and 554 respectively represent the types of protocols that have been used to identify an apparatus and the class of apparatus associated with this apparatus detected on the network. A class of apparatus or device class designates a specific function supported by the device. For example, according to the recommendations of the DLNA (Digital Living Network Alliance), the following classes can be listed: DMP (Digital Media Player), DMS (Digital Media Server), IGD (Internet Gateway Device). The UPnP standard also provides means for identifying apparatuses such as printers, scanners, security cameras etc.

The fields 553 and 554 which it was not possible to determine are referenced as being not available ("N/A").

A field 555 is also used to provide information on whether a device is active on its local LAN.

There are other techniques for identifying a device on the local LAN. For example, if a device does not respond to a discovery protocol such as the ones referred to here above, the tunnel end-point may carry out attempts at communication according to well-known Internet protocols (an HTTP connection on the port 80, an FTP connection through the port 21 etc) in order to determine whether the targeted machine is hosting a server application or whether it seems to be only a client of the devices of the local LAN.

FIG. 5 also illustrates an example of an AVP (Attribute Value Pair) structure 560 according to the L2TP protocol in order to send a list of addresses to a remote tunnel end-point. The use of this structure is explained in greater detail with reference to the step 607 of FIG. 6.

Figure 6:
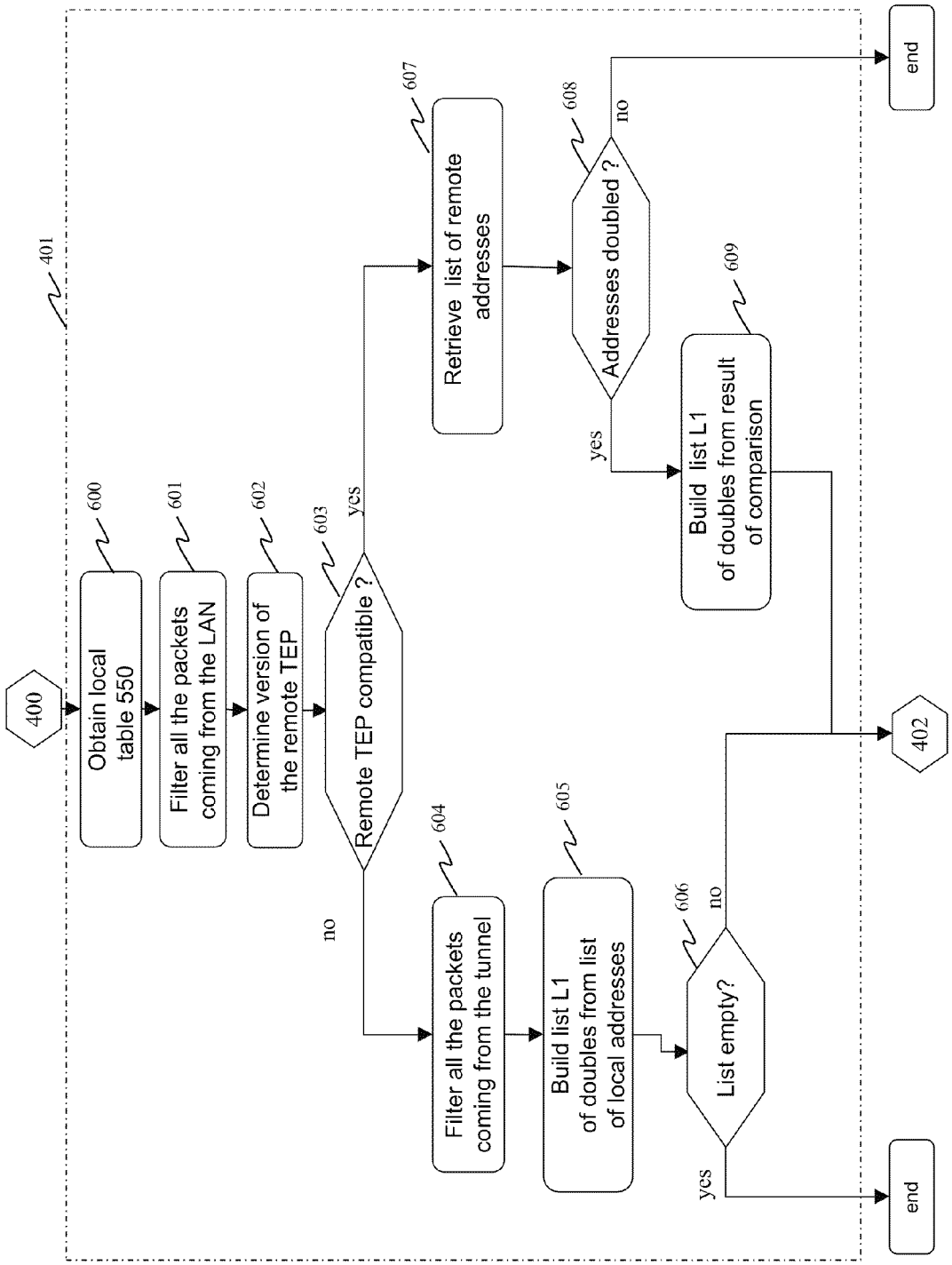
FIG. 6 is a schematic illustration of an algorithm for the detection of address conflict according to a particular embodiment of the invention.

FIG. 6 provides a schematic view, in a particular embodiment of the invention, of an algorithm for implementing the step 401 of FIG. 4. This algorithm is implemented on a first tunnel end-point 101 in order to determine IP address conflicts between the two sub-networks (103, 104) connected through the L2TP (layer 2 tunnelling protocol) tunnel.

It may be recalled that the step 400 of FIG. 4 (preceding the step 401) corresponds to the reception of a request for setting up a layer 2 tunnel from a second tunnel end-point 102, for example compatible with the L2TPv3 (layer 2 tunnelling protocol) standard of the RFC 2931 standard. This protocol enables the transportation of several level 2 connections in an IP/UDP tunnel, the UDP port used in a standard way being the 1701 port.

In this protocol, the tunnel is set up according to the following protocol exchange between the first tunnel end-point 101 and the second tunnel end-point 102.

An exchange (not shown) in three messages is first of all set up to start a control connection for the L2TP tunnel which is then followed by a setting up of sessions in this tunnel responsible then for conveying the level 2 data between the two remote sub-networks (103, 104) connected by the communications tunnel 100.

A first control message, called a "Start-Control-Connection-Request" (SCCRQ) message is sent by the client tunnel end-point (for example the tunnel end-point 102) to the server tunnel end-point (for example the first tunnel end-point 101) in order to start putting the tunnel 100 into operation according to the L2TP protocol.

A second control message named "Start-Control-Connection-Reply" (SCCRP) enables the server tunnel end-point 101 to provide an indication in response to the first SCCRQ message that the request has been accepted and that the setting up of the control connection can be continued.

A third control message called "Start-Control-Connection-Connected" (SCCCN) terminates the phase for setting up the L2TP control connection between the first tunnel end-point 101 and the second tunnel end-point 102.

A control message "Stop-Control-Connection-Notification" (StopCCN) can be sent by the first tunnel end-point 101 or the second tunnel end-point 102 to terminate the connection of the tunnel 100 (and if necessary close all the active sessions).

After the control connection has been set up, individual sessions can be created, each session corresponding to a level 2 transport stream between the first tunnel end-point 101 and the second tunnel end-point 102.

Thus, in the example proposed, the step 404 may consist in authorising the setting up of at least one session of the tunnel according to the L2TP protocol, i.e. authorising the first tunnel end-point 101 to open a session at the request of the second tunnel end-point 102, or in another example, authorising the filtering module of the first tunnel end-point 101 to transmit data coming from the local LAN on a session of the tunnel already set up between the first tunnel end-point 101 and the second tunnel end-point 102.

In order to maximise extensibility in the L2TP protocol, a method known as the AVP (Attribute Value Pair) message for the uniform encoding of control and data information is proposed by this protocol. This AVP structure consists of an association between a type of attribute and the value of this attribute, which can be re-usable to transmit any information between the first tunnel end-point 101 and the second tunnel end-point 102.

Thus, in a first step 600, called a step for obtaining a first address allocation table, the first tunnel end-point 101 must obtain the list of listed apparatuses of its local network. To this end, it applies any unspecified set of discovery methods from among the methods referred to here above with reference to FIG. 5. The result of this polling is recorded in a table of the 550 type. Preferably, the updating of the table 550 is continued and the step 600 is used only to obtain the last updating of this table.

Then, in a step 601, called a fourth filtering configuration step, the first tunnel end-point 101 is configured so that it filters (or blocks) all communications liable to travel on the tunnel. Thus, in a first stage, not all the packets of the first sub-network 103 are conveyed through the tunnel 100 to the second remote sub-network 104.

The L2TP protocol provides for the exchange of information on the version of the L2TP protocol, the identification of the brand of the remote apparatus or of the AVP structure particularized for proprietary extensions. Thus, in a step 602, it is easy for the first tunnel end-point 101 to know whether the second remote tunnel end-point 102 too, with which it is exchanging SCCRQ or SCCRP messages, implements the algorithms of the present invention.

A step 603 is used to verify whether the second remote tunnel end-point (in the example of the invention) is suited to implementing the mechanisms of the present invention.

Should the first tunnel end-point 101 be the only one adapted to executing the mechanisms of the present invention (which is a negative result at the step 603), the first tunnel end-point 101 must itself obtain a list of apparatuses in conflict with those that it has listed locally. To this end, it must poll the second remote sub-network 104 in order to determine the doubles (or conflicts) of address using classic network means. Thus, a session must be opened on the tunnel 100 of FIG. 1 in order to send these polling requests to the second remote sub-network 104.

In a step 604, the filtering module 101A of the first tunnel end-point 101 is configured so as to obtain a filtering configuration step, called a third filtering configuration step here below in the description. This third filtering configuration step makes it possible to let through no exchange between the first sub-network 103 and the second sub-network 104, and a session is then opened on the tunnel 100 according to the L2TP protocol. Thus, in the direction going from the first tunnel end-point 101 to the second tunnel end-point 102, only messages coming from the first tunnel end-point 101 are conveyed on the tunnel session. In the opposite direction, since the second remote tunnel end-point 102 is not suited to implementing the algorithms of the present invention, it allows all the level 2 frames to travel through the tunnel 100. The filtering module 101A of the first tunnel end-point 101 captures the messages carried in the tunnel that are intended for it and destroys all the other tunnels upon their arrival from the tunnel (i.e. the other messages not transmitted on the first sub-network 103).

In a step 605, the first tunnel end-point 101, according to a preferred embodiment, sets up a policy of polling IP addresses of the second remote sub-network 104. This step consists of the transmission, through the open session of the tunnel 100, of ARP requests for each known allocated IP address of the first sub-network 103 from each entry of the table 550. According to the ARP protocol, the first tunnel end-point 101 will send out a level 2 broadcast frame addressed to all the hosts of the second sub-network 104 comprising its own physical address and the IP address being sought. If a machine of the second sub-network 104 recognises itself as possessing the requested IP address, it responds by a Unicast to the first tunnel end-point 101.

Any positive response obtained is used to build a list L1 of the IP addresses doubled (in conflict) between the first sub-network 103 and the second sub-network 104.

Should this list L1 be vacant, i.e. should no address of the first sub-network 103 and of the second sub-network 104 be in conflict, the address conflict resolution algorithm ends in a step 606.

If not, the following step 402 is executed (this step is described in greater detail here below with reference to FIG. 7).

Should both tunnel end-points 101 and 102 be suited to executing the mechanisms of the present invention (with a positive result at the step 603), then in a step 607, the first tunnel end-point 101 and the second tunnel end-point 102 exchange their respective tables 550 pertaining to their local LANs.

Typically, following the reception of an SCCRQ request, the first tunnel end-point 101 sends out an SCCRP response to the second tunnel end-point 102. Then, the second tunnel end-point 102, in the SCCCN message, confirms the opening of the control connection of the tunnel by adding a particular AVP structure 560 listing the IP addresses used on its second sub-network 104 (and extracted from the table 550 pertaining to the second sub-network 104).

The AVP structure 560 of FIG. 5, according to the L2TP tunnelling protocol, is used to send a list of addresses to a remote tunnel end-point. The AVP structure 560 is aligned on 32 bits.

The AVP header 561 comprises an attribute code (Attribute Type or AT) chosen so that the destination tunnel end-point recognises the type of structure sent.

The AVP header 561 furthermore comprises an indication of the number (NE or Number of Entries) of apparatuses recognised on the network, an indication of the length (L) of the AVP structure, an identifier of the manufacturer or vendor (VID or Vendor Identifier) of the machine originating the AVP structure, a reserved field (R) used for future extensions of the AVP structure. In compliance with the recommendations of the RFC 3931 (L2TPv3) standard, the two most significant bits of the first 32-bit word of the AVP header 561 are set at zero (bits M and H of the AVP header defined by the RFC 3931 standard).

Furthermore, the AVP structure 560 comprises a payload data part 562 listing the IP addresses of these apparatuses.

In a preferred embodiment, this list of IP addresses is formed by IP address fields 522 and apparatus class fields 554 transmitted in the form of values separated by commas according to the computer format opened in CSV (Comma Separated Values) text mode.

Naturally, this CSV format can be quite easily replaced by an XML type format or any other format adapted to the description of lists.

Thus, in a step 608, the first tunnel end-point 101 can then successfully complete a verification of the IP addresses that are doubled (in conflict) between the first sub-network 103 and the second sub-network 104 in comparing its local list 550 with the list of the second remote tunnel end-point 102 for which it has received an AVP structure 560.

If there is no conflict (a negative test during the step 608), the algorithms come to an end.

If not, in a step 609, each address doubled (in conflict) is referenced in a list L1 comprising, preferably, at least information on the IP addresses 552 in conflict, the apparatus class 554 for the apparatus of the first sub-network 103, the apparatus class 554 for the apparatus of the second sub-network 104. This list L1 is then used to implement the algorithm of the step 402 of FIG. 4 described in greater detail with reference to FIG. 7.

FIG. 7 provides a detailed description of the algorithm of the step 402 of FIG. 4 according to a particular embodiment of the invention. FIG. 7 provides a schematic illustration of an algorithm of the present invention implemented on the first tunnel end-point 101 for the application of the correction of management of the IP addresses. The selection of the apparatuses to which this correction is applied is done so as to disturb the behaviour of the first sub-network 103 and the second sub-network 104 as little as possible.

In a step 701, for each input of the list L1, the choice of an apparatus among two apparatuses in address conflict is determined, this apparatus being preferably chosen to modify its IP address. The resulting list L2 is used thereafter to implement the algorithm of the step 403 of FIG. 4, described in greater detail with reference to FIG. 8.

A step 702 is used to determine whether one of the two apparatuses is one of the Internet gateways 105 or 106.

If this is the case, a step 710 is used to select the apparatus that is not a gateway.

Should the two gateways be in a state of address conflict (the step is not shown) preferably the gateway chosen is the one positioned in the network in which the first tunnel end-point 101, i.e. the gateway 105.

In a step 711, the selected gateway is then added to a list L2 of apparatuses.

If neither of the two apparatuses is an Internet gateway 105 or 106 (negative response at the step 702), preferably in a step 702, a client class apparatus (for example DMP or N/A) is chosen. Indeed, it is less disturbing for the network to change an IP address of a client station than to change the IP address of a server whose services may be used by other apparatuses of the network.

A step 704 is used to verify whether only one of the apparatuses among the two selected apparatuses is a client.

If this is the case, it is selected and then added to the list L2 of apparatuses in the step 711.

If this not the case, a step 705 is used to preferably choose an apparatus supporting a discovery protocol such as for example the UPnP protocol because this protocol will alert the other apparatuses of the network to the address modifications to access this UPnP apparatus.

In a step 706, a check is made to see if only one of the apparatuses of the pair of apparatuses being analysed supports the UPnP protocol.

If this is the case, it is selected and then added to the list L2 of apparatuses in the step 711.

If this is not the case, a check is made in a step 707 to find out which of the two apparatuses in conflict has communications set up with other devices of its local LAN.

In a step 708, a check is made to see whether the test of the step 707 has enabled or not enabled the determining of a preferred apparatus.

If no preferred apparatus has been determined, then any one of the two apparatuses is selected in a step 709 and added to the list L2 of apparatuses in the step 711.

If a preferred apparatus is determined, it is added to the list L2 of apparatuses in the step 711.

It must be noted that this selection algorithm is given by way of an example. Clearly, any other selection criterion may be envisaged such as for example a static selection that is performed by a user of a local area network and lists server apparatuses not to be modified.

FIG. 8 describes a detailed view of the algorithm performed at the step 403 of FIG. 4 and implemented on a first tunnel end-point 101 for the application of a correction of IP address management according to the present invention.

This algorithm can be broken down mainly into three successive phases:
- a phase of preparation of the conditions leading to the success of the re-allocations of addresses and formed by the sequence of steps 801 to 806;
- a phase of re-allocation of addresses for each selected apparatus, constituted by the sequence of steps 807 to 808;
- a phase for updating the network with the new addresses coming from the re-allocation phase and formed by the sequence of steps 809 to 810.

A first step 801 consists in checking the availability of free addresses on the DHCP servers so as to provide new addresses for the apparatuses in conflict. More specifically, the step 801 is used to obtain the number of available addresses (addresses not allocated to an apparatus) included in the address spaces associated with the first sub-network 103 and the second sub-network 104.

Indeed, following the step 401 of FIG. 4, the first tunnel end-point 101 knows the number of machines connected to the local LAN through its table of apparatuses 550, the number of machines connected to the remote LAN through the AVP structure 560 and the need to re-allocate addresses through the lists L1 and L2.

Following the above-mentioned TR-64 recommendation, the first tunnel end-point 101 is capable of interrogating the "LANHostConfigManagement" service through the "GetAddressRange" action, so as to obtain the address space configured for the DHCP server of each of the Internet gateways 105 and 106.

A following step 802 ascertains that it is necessary to extend at least one of the address spaces associated with the first and second sub-networks (103, 104). This step 802 is made especially by comparison of the number of available addresses obtained at the step 801 with the number of selected apparatuses.

If no extension is needed, i.e. if the number of available addresses is greater than the number of selected apparatuses, a following step 806 is performed. This step 806 is described in greater detail here below in the description.

If the number of available addresses is smaller than the number of selected apparatuses, a step 803 is used to achieve an extension of at least one of the address spaces associated with the first and second sub-networks (103, 104).

More specifically, in the step 803, at least one of the DHCP servers receives a command for extending its address space. This request is compliant with the UPnP IGD ("LANHostConfigManagement") services of the Internet gateways corresponding to the "SetAddressRange" action with a value greater than or equal to the need detected in the step 801. Preferably, each DHCP server is updated in order to support a minimum number of renewals of addresses corresponding to the number of selected apparatuses of its local LAN. For example, if the first tunnel end-point 101 has selected three apparatuses of the first sub-network 103 and four apparatuses of the second sub-network 104 for the address re-allocation, the first tunnel end-point 101 seeks to obtain a free set of at least three addresses for the DHCP server of the gateway 105 and at least four addresses for the DHCP server of the gateway 106.

A step 804 is used to ascertain that the DHCP servers have been configured accurately.

If none of the servers has been configured accurately, an alternative is proposed in a step 805 in starting a new DHCP server on the first tunnel end-point 101, this DHCP server possessing an address space complementary to the address spaces of the already active DHCP servers of the first and second sub-networks (103, 104), especially the DHCP servers of the Internet gateways.

In subsequent configuration step 806, called a first filtering configuration step, the filtering module 101A of the first tunnel end-point 101 is configured in compliance with the results of the previous configuration phase (steps 801 to 805). Thus configured, the filtering module 101A allows the transit, through the tunnel, in addition to the messages between the first and second tunnel end-points on the management of the tunnel, of only the network requests needed to enable the DHCP clients to arrive at an IP address re-allocation. This relates naturally to the DHCP messages from clients that are not physically present on the same network as the DHCP server that has to reply to it, but also to the ICMP and ARP messages sent for the validation of new IP addresses for these clients.

In a first embodiment, if it is determined in the step 603 of FIG. 6 that the second tunnel end-point 102 is adapted to implementing the algorithms of the present invention, the second tunnel end-point 102 filters none of the communications from the tunnel set up with the first tunnel end-point 101. Thus, the first tunnel end-point 101 is the only tunnel end-point guaranteeing the authorisation of communications conveyed in the tunnel.

In a second preferred embodiment, and in order to optimise the payload bandwidth resources of the tunnel, the first tunnel end-point 101 informs the second tunnel end-point 102 supporting the invention of a piece of filtering information for filtering communications conveyed on the tunnel to be set up on the filtering module 102A. For example, it is possible to use a type 560 AVP structure of FIG. 5 to convey the list of apparatuses (identified by their MAC addresses) authorised to communicate on the tunnel. This structure 560 may typically be conveyed in a control message "HELLO" of the L2TP protocol.

In order to re-allocate new IP addresses to the selected apparatuses, a subsequent step 807 is performed to prompt the DHCP client to request this re-allocation.

In fact, the "FORCERENEW" message of the DHCP protocol is used here according to an indirect use of the common practice laid down by the DHCP reconfigure extension standard according to the RFC 3203 standard. The procedure provides that the DHCP server will send a DHCP "FORCERENEW" message to one of its clients to force it to re-request the validation of its IP configuration request. An IP configuration validation request of this kind is performed by means of a DHCP "REQUEST" message. The server then responds negatively to this request by means of a DHCP "NAK" message in order to force the client to re-enter a full address allocation request phase.

The first tunnel end-point 101 then replaces the DHCP server concerned and sends a DHCP "FORCERENEW" message whose IP source and Source MAC addresses are those of the DHCP server and whose IP destination and MAC destination addresses are those of the selected DHCP client. In one optional embodiment, an authentication element used between the DHCP server and the clients associated with it may be added, in compliance with the RFC 3118 standard.

The DHCP clients selected will then send out a DHCP request message to the DHCP server which will respond with the same information as was previously possessed by the client device. However, the DHCP standard provides for verification by the client of the uniqueness of the IP address even in the case of a renewal procedure. Thus if, by sending the ARP message comprising this IP address, the client discovers that this IP address is already being used (the other apparatus of the remote network responds to the "ARP" request, the tunnel having been configured in the step 806 in order to let through these ARP request and response messages), it sends a DHCP "DECLINE" response to the DHCP server in order to inform it that this address has already been allocated to another apparatus. It then resumes a complete address re-allocation procedure. This second procedure then leads to the use of one of the addresses that are free in the address space prepared during the steps 803 or 805.

The first tunnel end-point 101 will then listen on the network for the results of the address re-allocations. Following a re-allocation, the DHCP client apparatus verifies the uniqueness of the IP address proposed to it by one of the DHCP servers. As indicated here above, an ARP request is broadcast at the Ethernet level by this client. This request is then transmitted on the first sub-network 103 and the second sub-network 104. Thus, the first tunnel end-point 101 is capable of receiving the indication of the new IP address assigned to the selected apparatus, regardless of the fact that this apparatus is localised on the first sub-network 103 or the second sub-network 104.

A following step 808 then consists in detecting the ARP requests whose source MAC address is that of the selected DHCP client apparatus. The IP address of the selected client DHCP apparatus is then extracted from the detected request.

Once these new IP addresses are determined for the selected apparatuses, a step 809 is used to check for the compliance of the configuration of the Internet gateway 105 or 106.

Indeed, a check is made to see whether the old IP address of each selected apparatus is referenced by an active service of the Internet gateway of its local LAN. For example, according to the UPnP IGD specification (taken up in the above-mentioned TR-64 recommendation), a "WANIPConnection or WANPPPConnection service is obligatory and enables modification of the translation table of the addresses for communications from the Internet to a machine of the local LAN ("NAT PortMapping"). This "NAT PortMapping" service is responsible for analysing the packets that arrive at the WAN interface (i.e. that are connected to the Internet) of the Internet gateway 105 or 106 and re-directing them to the destination apparatus of the local LAN by carrying out an IP address and port translation. For example, a client apparatus of the local LAN can implement a HTTP server and can have configured the Internet gateway to re-direct the requests received from the Internet to the HTTP server and thus make the HTTP server which has only a non-routable IP address accessible from the Internet.

Thus, by interrogating the service by the UPnP "GetGenericPortMappingEntry" UPnP action, the first tunnel end-point 101 can detect the presence in the NAT table of the former IP address of a selected apparatus (InternalClient field) and can update this table by using for example the UPnP commands "DeletePortMapping" and "AddPortMapping" with a use of the old and new IP address of the selected apparatus.

In a step 810, the filtering module 101A of the first tunnel end-point 101 is configured in accordance with the results of the previous re-allocation phase (steps 807 and 808). This filtering step 810, called a second filtering configuration step, is used to configure the first tunnel end-point 101 so as to allow the transit on the tunnel of all the communications of the first sub-network 103 and of the second sub-network 104 for each apparatus that is no longer in an address conflict situation.

In a preferred embodiment, the first tunnel end-point 101 thus controls the updating of the filtering module 102A of the second tunnel end-point 102.

In one optional embodiment, if address conflicts persist (through an error during the address re-configuration attempt), communications pertaining to apparatuses still in conflict are kept blocked by the filtering module 101A of the tunnel end-point 101.

FIG. 9 illustrates a device implementing the method of the present invention according to a particular embodiment.

An apparatus implementing the invention is for example a generic communications device 1000.

For example, the first tunnel end-point 101 or the second tunnel end-point 102 mentioned here above with reference to FIG. 1 is identical to the generic device 1000.

This generic device 1000 may be connected in particular to any means for the storage of images, videos or sound connected to a graphic card and delivering multimedia information to the generic device 1000.

Thus, the generic device 1000 has a communications bus 1002 to which the following are connected:

a central processing unit 1003 (for example a microprocessor referenced CPU);

a read-only memory 1004 referenced ROM capable of comprising the above-mentioned software program or programs and referenced Prog;

a random-access memory 1006 (cache memory referenced RAM) comprising registers suited to recording variables and parameters created and modified in the course of execution by the above-mentioned software program or programs;

a communications interface 1018 linked to at least one communications network 1020, for example the first sub-network 103 or the second sub-network 104 and the Internet type backbone network 107, the interface being capable of transmitting and receiving data with these networks.

The generic device 1000 also has optionally:

a screen 1008 used to view the data and/or serve as a graphic user interface with the network administrator to interact with the programs according to the invention using a keyboard 1010 or any other means such as a pointing device, for example a mouse 1011 or an optical pencil;

a hard disk drive 1012 capable of comprising the above-mentioned programs "Prog";

The communications bus 1002 enables communications and interoperability between the different means included in the generic device 1000 or connected to this device.

More generally, through the communications bus 1002, the central processing unit 1003 can communicate instructions to any device included in the generic device 1000 directly or by means of another device of the generic device 1000.

The executable code of each of the software programs mentioned here above enabling the generic device 1000 to implement the method of the invention for the management of IP address conflict between two distinct networks whose association is in progress, can be stored for example in the hard disk drive 1012 or in the read-only memory 1004.

The central processing unit 1003 controls and directs the execution of the instructions or portions of software code of the software program or programs according to one embodiment of the invention. When the equipment is powered on, the software program or programs which are stored in a non-volatile memory (for example the hard disk drive 1012 or the read-only memory 1004) are transferred to the random-access memory 1006, which will then contain the executable code of the software program or programs of the invention, as well as registers to memorize the variables and parameters needed to implement the method for the temporary increasing of the sending bit rate oft a TCP server according to the invention.

It must be noted that the communications apparatus comprising the device according to the invention can also be a programmed apparatus.

This apparatus then contains the code of the computer program or programs, for example hard-wired into an applications specific integrated circuit (ASIC).

It will be noted that the invention is not limited to a purely hardware implantation but that it can also be implemented in the form of a sequence of instructions of a computer program or any other form combining a hardware part and a software part. Should the invention be implanted partially or totally in software form, the corresponding sequence of instructions could be stored in a detachable storage means or a non-transitory computer-readable storage medium (such as for example a floppy, a CD-ROM or a DVD-ROM) or in a non-detachable storage means, this storage means being partially or totally readable by a computer or a microprocessor.

What is claimed is:

1. A method for managing address spaces and setting up a communications tunnel between a first tunnel end-point of a first communications sub-network and a second tunnel end-point of a second communications sub-network distinct from said first sub-network, said method being performed by the first tunnel end-point and comprising the steps of:

(a) detecting a request for setting up the communications tunnel between the first sub-network and the second sub-network distinct from said first sub-network, wherein at least one apparatus is connected to each of said first sub-network and said second sub-network and each apparatus connected to each of said first sub-network and said second sub-network is allocated an address included in an address space associated with each of said first sub-network and said second sub-network;

(b) in response to the detecting of the request, detecting at least one pair of apparatuses to which a same address is allocated, each pair of apparatuses comprising a first apparatus of the first sub-network and a second apparatus of the second sub-network;

(c) upon the detecting of the at least one pair of apparatuses, selecting at least one apparatus of each pair of apparatuses;

(d) upon the selecting of the at least one apparatus, allocating a new address to each selected apparatus, wherein the allocating of the new address includes the steps of:

obtaining a number of addresses that are included in at least one of the address spaces associated with said first and second sub-networks and that are not yet allocated to an apparatus of said first and second sub-networks;

comparing said number of addresses with the number of selected apparatuses; and, if said number of addresses is smaller than the number of selected apparatuses, extending at least one of the address spaces associated with said first and second sub-networks in order to make said number of addresses greater than or equal to the number of selected apparatuses; and (e) after the allocating step, setting up the tunnel between the first and second sub-networks.

2. The method according to claim 1, wherein the step of extending at least one of the address spaces comprises at least one of the following steps:

extending the address space of at least one active address server of one of said first and second sub-networks; and starting a new address server possessing an address space, addresses of the address space of the new address server being distinct from the addresses of the address spaces of the already active address servers of said first and second sub-networks.

3. The method according to claim 1, wherein the step of allocating a new address comprises a step of updating an access gateway, for the first sub-network to access a backbone network, according to the new address of each selected apparatus.

4. The method according to claim 1, wherein the step of allocating a new address comprises steps of:

determining, among the at least one selected apparatus, an apparatus still in conflict to which a new address has not been allocated; and modifying a filtering configuration of the first tunnel end-point to perform a second filtering operation so as not to allow transmission via the tunnel of messages relating to said apparatus still in conflict.

5. The method according to claim 1, wherein the step of detecting said at least one pair of apparatuses to which the same address is allocated comprises steps of:

obtaining a first address allocation table within the first sub-network;

obtaining a second address allocation table within the second sub-network; and detecting said at least one pair of apparatuses to which the same address is allocated, by comparison of said first and second address allocation tables.

6. The method according to claim 1, wherein the step of detecting said at least one pair of apparatuses to which the same address is allocated comprises steps of:

obtaining a first address allocation table within the first sub-network;

transmitting a polling message to the second tunnel end-point for polling the second sub-network for each address of said first address allocation table; and detecting said at least one pair of apparatuses to which the same address is allocated, by analysis of a response message to the polling message.

7. The method according to claim 1, wherein the step of selecting said at least one apparatus from each pair of apparatuses is performed based on at least one rule belonging to the group comprising the following rules:

an apparatus that is not an access gateway for accessing a backbone network is selected if a pair of apparatuses comprises one such apparatus, an apparatus that is of a client-type is selected if a pair of apparatuses comprises one such apparatus, an apparatus that does not have any communications activity on the network is selected if a pair of apparatuses comprises one such apparatus; and an apparatus that is not included in a pre-determined list of apparatuses whose addresses do not have to be modified is selected if a pair of apparatuses comprises one such apparatus.

8. A non-transitory computer-readable storage medium storing a computer program that, when executed by a computer, causes the computer to perform the method according to claim 1.

9. A device for managing address spaces and setting up a communications tunnel between a first tunnel end-point of a first communications sub-network and a second tunnel end-point of a second communications sub-network distinct from said first sub-network, the device comprising:

a first sub-network and at least one apparatus connected to said first sub-network, wherein each apparatus connected to said first sub-network is allocated an address included in an address space associated with said first sub-network;

a second sub-network and at least one apparatus connected to said second sub-network, wherein each apparatus connected to said second sub-network is allocated an address included in an address space associated with said second sub-network; and a first tunnel end-point of said first sub-network, wherein the first tunnel end-point comprises:

a microprocessor cooperating with a memory, wherein the microprocessor and the memory cooperate to detect a request for setting up the communications tunnel between the first sub-network and the second sub-network, wherein, after the microprocessor and the memory cooperate to detect the request, the microprocessor and the memory cooperate to detect at least one pair of apparatuses to which a same address is allocated, each pair of apparatuses comprising a first apparatus of the first sub-network and a second apparatus of the second sub-network, wherein, after the microprocessor and the memory cooperate to detect the at least one pair of apparatuses, the microprocessor and the memory cooperate to select at least one apparatus of each pair of apparatuses;

wherein, after the microprocessor and the memory cooperate to select the at least apparatus, the microprocessor and the memory cooperate to allocate a new address to each selected apparatus, wherein the microprocessor and the memory cooperate to:

obtain a number of addresses that are included in at least one of the address spaces associated with said first and second sub-networks and that are not yet allocated to an apparatus of said first and second sub-networks;

compare said number of addresses with the number of selected apparatuses; and, if said number of addresses is smaller than the number of selected apparatuses, extend at least one of the address spaces associated with said first and second sub-networks in order to make said number of addresses greater than or equal to the number of selected apparatuses, and wherein, after the microprocessor and the memory cooperate to allocate the new address, the microprocessor and the memory cooperate to set up the tunnel between the first and second sub-networks.

10. The device according to claim 9, wherein the microprocessor and the memory cooperate to extend the address space of at least one active address server of one of said first and second sub-networks; and wherein the microprocessor and the memory cooperate to start a new address server possessing an address space, the addresses of the address space of the new address server being distinct from the addresses of the address spaces of the already active address servers of said first and second sub-networks.

11. The device according to claim 9, wherein the microprocessor and the memory cooperate to update an access gateway, for the first sub-network to access a backbone network, according to the new address of each selected apparatus.

12. The device according to claim 9,
wherein the microprocessor and the memory cooperate to determine among said at least one selected apparatus, an apparatus still in conflict to which a new address has not been allocated; and
wherein the microprocessor and the memory cooperate to modify a filtering configuration of the first tunnel end-point to perform a second filtering so as not to allow transmission via the tunnel of messages relating to said apparatus still in conflict.

13. The device according to claim 9,
wherein the microprocessor and the memory cooperate to obtain a first address allocation table within the first sub-network;
wherein the microprocessor and the memory cooperate to obtain a second address allocation table within the second sub-network; and
wherein the microprocessor and the memory cooperate to detect said at least one pair of apparatuses to which the same address is allocated, by comparison of said first and second address allocation tables.

14. The device according to claim 9,
wherein the microprocessor and the memory cooperate to obtain a first address allocation table within the first sub-network;
wherein the microprocessor and the memory cooperate to transmit a polling message to the second tunnel end-point for polling the second sub-network for each address of said first address allocation table; and
wherein the microprocessor and the memory cooperate to detect said at least one pair of apparatuses to which the same address is allocated, by analysis of a response message to the polling message.

15. The method according to claim 1,
wherein the step of allocating the new address is preceded by a step of modifying a filtering configuration of the first tunnel end-point to perform a first filtering operation enabling only messages pertaining to an address allocation to be allowed to be transmitted between the first and second sub-networks via the tunnel, and
wherein the step of setting up the tunnel is preceded by a step of modifying the filtering configuration of the first tunnel end-point according to the new address allocated to each selected apparatus.

16. The device according to claim 9,
wherein the microprocessor and the memory cooperate to modify a filtering configuration of the first tunnel end-point to perform a first filtering operation enabling only messages relating to an address allocation to be allowed to be transmitted between the first and second sub-networks via the tunnel, and
wherein the microprocessor and the memory cooperate to modify the filtering configuration of the first tunnel end-point according to the new address allocated to each selected apparatus.

* * * * *